(12) United States Patent
Mizuno et al.

(10) Patent No.: US 7,276,272 B2
(45) Date of Patent: Oct. 2, 2007

(54) STRETCH RELEASING ADHESIVE ARTICLE FOR FRAGILE SURFACES

(75) Inventors: Eiji Mizuno, Tokyo (JP); James L. Bries, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 239 days.

(21) Appl. No.: 10/953,852

(22) Filed: Sep. 29, 2004

(65) Prior Publication Data

US 2006/0068144 A1  Mar. 30, 2006

(51) Int. Cl.
*B32B 9/00* (2006.01)
*B32B 3/00* (2006.01)
*A47G 1/17* (2006.01)
*A47G 29/00* (2006.01)

(52) U.S. Cl. .................. 428/40.1; 428/156; 428/343; 248/205.3; 248/683

(58) Field of Classification Search ............... 428/40.1, 428/156, 343, 353; 248/205.3, 205.4, 683
See application file for complete search history.

(56) References Cited

U.S. PATENT DOCUMENTS

| | | | |
|---|---|---|---|
| 4,024,312 A | 5/1977 | Korpman | |
| 5,507,464 A | 4/1996 | Hamerski et al. | |
| 5,516,581 A | 5/1996 | Kreckel et al. | |
| 5,672,404 A * | 9/1997 | Callahan et al. | ............. 428/100 |
| 6,001,471 A * | 12/1999 | Bries et al. | .................. 428/343 |
| 6,106,937 A * | 8/2000 | Hamerski | .................... 428/343 |
| 6,231,962 B1 | 5/2001 | Bries et al. | |
| 6,406,781 B1 * | 6/2002 | Hamerski | ................. 428/317.3 |
| 6,569,521 B1 | 5/2003 | Sheridan et al. | |

FOREIGN PATENT DOCUMENTS

DE    33 31 016 A1    10/1984
JP    2004041535 A    2/2004

* cited by examiner

*Primary Examiner*—Patricia L Nordmeyer
(74) *Attorney, Agent, or Firm*—David B. Patchett

(57) ABSTRACT

A stretch releasing adhesive article for mounting on a wall surface includes an elongated stretch releasing adhesive strip having a first major surface with a non-adhesive contact surface adjacent the first end, and a backplate having a first major surface including a protrusion arranged in overlapping relation with the adhesive strip non-adhesive contact surface that serves to concentrate a force applied by a user in the region of the first end of the backplate in the region of the non-adhesive contact surface of the adhesive strip. A method of adhesively mounting an item to, and removing an item from, a wall surface that is susceptible to damage without damaging the surface is also disclosed.

16 Claims, 3 Drawing Sheets

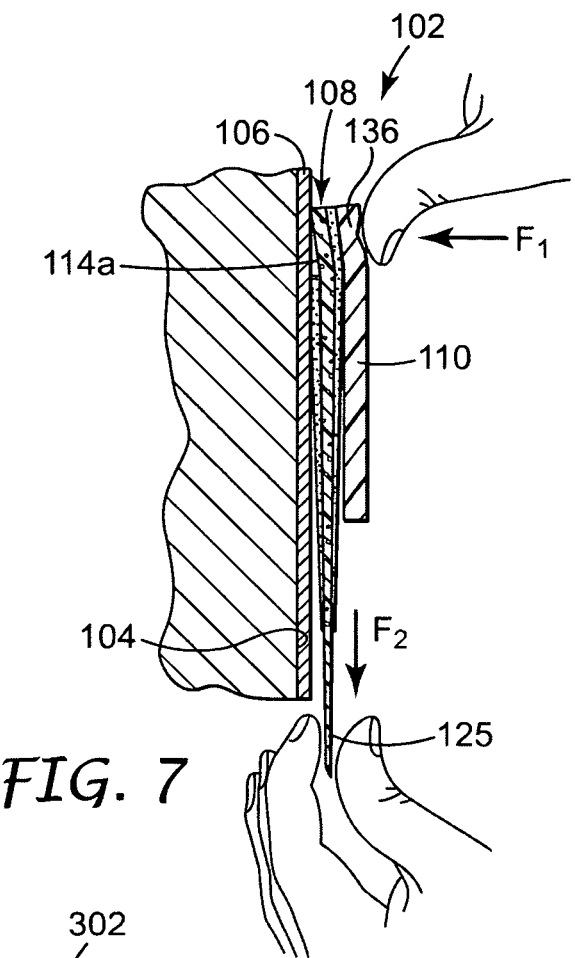
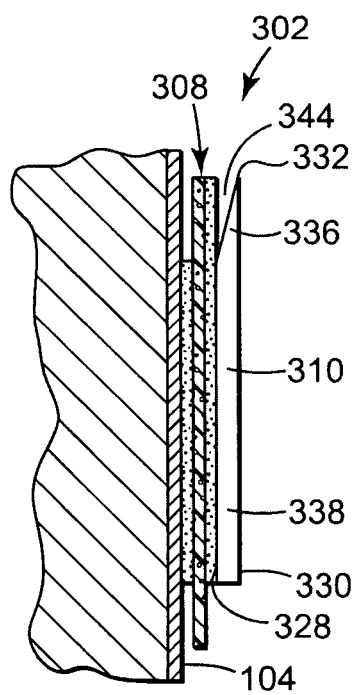
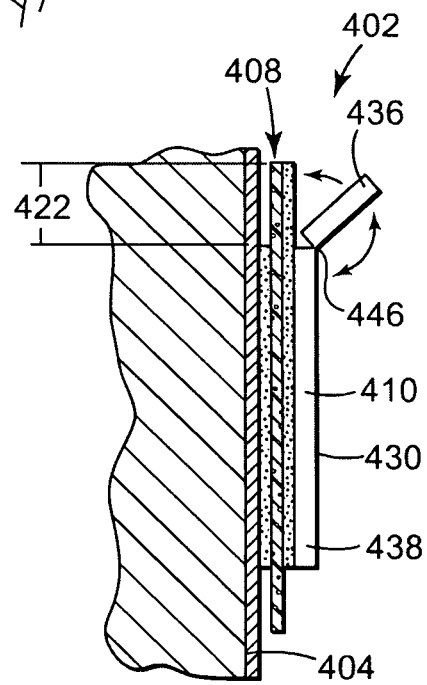
FIG. 7
FIG. 8
FIG. 9

STRETCH RELEASING ADHESIVE ARTICLE FOR FRAGILE SURFACES

FIELD

The present invention relates generally to stretch releasing adhesive articles, and, more particularly, to a stretch releasing adhesive article that can be cleanly removed from a fragile substrate, such as a wall surface, without damaging the substrate.

BACKGROUND

Stretch releasing adhesive strips are known in the patented prior art. U.S. Pat. No. 4,024,312 (Korpman), for example, discloses a highly conformable adhesive tape including a highly extensible and elastic backing film laminated with an adhesive layer. The adhesive strip is easily stretchable and may be removed from a surface by stretching the strip lengthwise in a direction substantially parallel to the surface.

German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

U.S. Pat. No. 5,516,581 (Kreckel et al.) discloses a removable adhesive strip having a highly extensible and substantially inelastic backing coated with a layer of pressure sensitive adhesive and a non-adhesive pull tab to facilitate stretch removal. The adhesive strip can be removed from most surfaces without damaging the substrate by grasping the non-adhesive pull tab and stretching the strip in a direction substantially parallel to the surface of the substrate.

U.S. Pat. No. 6,231,962 (Bries et al.) discloses a removable foam adhesive strip. The adhesive strip comprises a backing including a layer of polymeric foam and a layer of pressure-sensitive adhesive coated on at least one surface of the backing.

A commercially available stretch releasing adhesive tape strip is the product sold under the trade designation COMMAND by 3M Company, St. Paul, Minn.

Stretch releasing adhesive strips are used to mount a variety of items such as hooks, calendars, posters, and signs on a surface. While stretch releasing strips generally work well and can be removed cleanly without damaging most surfaces, certain fragile surfaces may be damaged during the removal process if the adhesive strip is not removed carefully.

U.S. Pat. No. 5,626,931 (Lühmann) discloses an adhesive film strip having a design intended to reduce the likelihood that the surface will be damaged during the stretch removal process. In particular, the adhesive film strip is provided with an end terminating in a pointed, serrated, convex, curved or wavy shape such that the bond area decreases at the end of the adhesive film strip.

SUMMARY OF THE INVENTION

Certain surfaces having delicate or fragile wall coverings, such as wallpaper, paint, or vinyl wall coverings, are prone to minor surface damage when a stretch releasing adhesive is removed from the surface, particularly at the end of the stretch removal process when only a small portion of the adhesive strip remains adhered to the surface. That is, as the adhesive strip is progressively stretched and removed from a surface, the surface or wall covering may tear as the stretch removal process approaches the end portion of the adhesive strip.

It would therefore be desirable to provide a stretch releasing adhesive article that provides strong holding power yet can be cleanly removed from fragile substrates without damaging the substrate. The present invention overcomes the current limitations in the field by providing a stretch releasing adhesive article that can be cleanly removed from fragile substrates without damaging the substrate, and a method of cleanly removing a stretch releasing adhesive article from a fragile substrate without damaging the substrate.

The present invention provides a stretch releasing adhesive article for mounting on a substrate, such as a wall surface. The article includes an elongated stretch releasing adhesive strip and a backplate arranged adjacent the adhesive strip. The adhesive strip has first and second opposed major surfaces, first and second ends, and a non-adhesive pull tab forming the second end. At least the first major surface of the adhesive strip includes a non-adhesive contact surface adjacent the first end. The backplate has first and second opposed major surfaces and first and second ends arranged adjacent the adhesive strip second major surface. The backplate first major surface includes a protrusion arranged in overlapping relation with the adhesive strip non-adhesive contact surface, thereby to concentrate a force applied by a user in the region of the second end of the backplate in the region of the non-adhesive contact surface of the adhesive strip.

In one embodiment, the protrusion is in contact with the adhesive second major surface of the adhesive strip. In a specific embodiment, the non-adhesive contact surface has a longitudinal length of at least 0.5 millimeters. In another embodiment, the adhesive strip second major surface adjacent the first end is also non-adhesive. The backplate second major surface opposite the protrusion may be provided with indicia indicating where a user should press against the backplate during the removal process.

In another embodiment, the backplate includes a tapered first end portion arranged in overlapping relation with the adhesive strip non-adhesive contact surface. In yet another embodiment, the backplate includes a first end portion hingably connected with a second end portion and the first end portion is movable between a first position adjacent the backplate second end portion and a second position adjacent the adhesive strip.

In another aspect, the present invention provides a method of adhesively mounting an item to, and removing an item from, a fragile wall surface, which is susceptible to damage, without damaging the surface. The method comprises the steps of: (1) providing an elongated stretch releasing adhesive strip having first and second opposed major surfaces, first and second ends, and a non-adhesive pull tab forming the second end, at least the first major surface of the adhesive strip including a non-adhesive surface adjacent the first end, whereby the non-adhesive surface is arranged adjacent the delicate surface, (2) adhesively bonding the item to the wall surface by adhering the adhesive strip first major surface to the wall surface and arranging the item on the adhesive strip second major surface, thereby bonding the item to the wall surface, (3) applying a force to the item opposite the strip non-adhesive surface, thereby to firmly maintain the non-adhesive surface of the adhesive strip in contact with the wall surface during the removal process, and (4) stretching the adhesive strip by applying a longitudinal force to the non-adhesive pull tab to debond the adhesive strip from the item and the wall surface.

Advantages of certain embodiments of the invention are that the stretch releasing article can be cleanly removed from a fragile wall surface without damaging the surface, and that the article can be removed without experiencing catapulting of the backplate or other items that are mounted on the wall surface.

BRIEF DESCRIPTION OF THE DRAWINGS

The present invention will be further described with reference to the accompanying drawings, in which:

FIG. 7 is a cross-sectional side view showing the article of FIG. 2 being removed from a wall surface;

FIG. 8 is a partial cross-sectional side view of a second embodiment of the invention; and FIG. 9 is a partial cross-sectional side view of a third embodiment of the invention.

DETAILED DESCRIPTION

Figure 1:
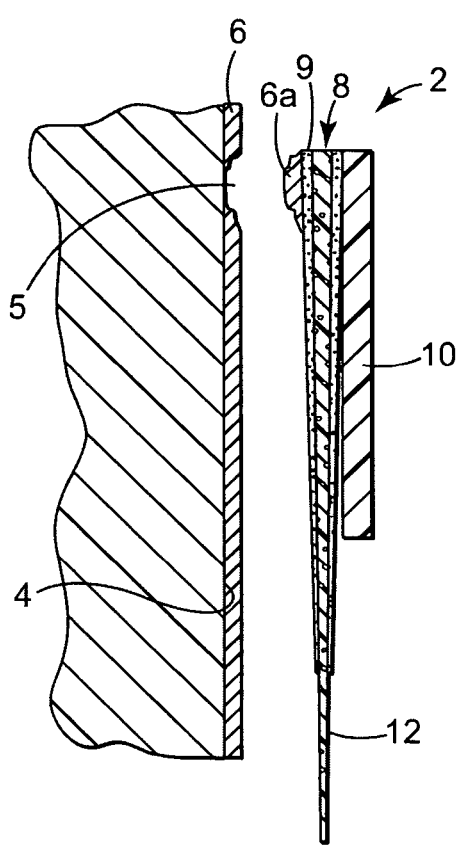
FIG. 1 is a cross-sectional side view of a stretch releasing adhesive article according to the prior art.

Referring now to the drawings, FIG. 1 shows a stretch releasing adhesive article 2 according to the prior art being removed from a wall surface 4, which includes a wall covering 6 such as wallpaper, and causing damage to the wall surface 4. Throughout the description and the accompanying figures, functionally similar features are referred to with like reference numerals incremented by 100.

The stretch releasing article 2 includes a double-sided stretch releasing adhesive strip 8 and a backplate 10 that is adhesively bonded to the adhesive strip 8. The adhesive strip 8 includes a non-adhesive pull tab 12 that is manually grasped and pulled by a user to stretch remove the adhesive strip 8 from the wall surface 4.

During the removal process, the adhesive strip 8 is progressively stretched and simultaneously removed from the wall surface 4 and the backplate 10. As the adhesive strip 8 is stretched, the surface area of the adhesive bond between the adhesive strip 8 and the wall surface 4 is reduced and, consequently, the removal force becomes concentrated in a small region 5 of the wall surface 4 adjacent the end 9 of the adhesive strip 8. If the wall covering 6 is formed of a delicate or fragile material that is susceptible to damage and the adhesive article 2 is not removed carefully, the concentrated removal force may exceed the cohesive strength of the wall covering 6, thereby causing the wall covering 6 to tear in the region 5 of the concentrated force. If this occurs, the wall surface 4 will sustain damage as a small piece 6a of the wall covering 6 separates from the wall covering 6 and remains adhered to the adhesive strip 8.

Figure 2:
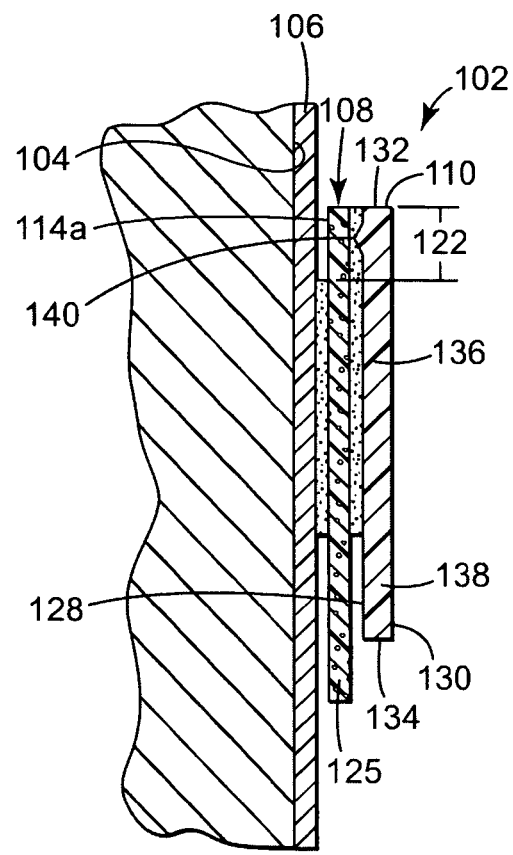
FIG. 2 is a cross-sectional side view of a stretch releasing article according to the invention.

FIG. 2 shows a stretch releasing adhesive article 102 according to one embodiment of the invention adhesively bonded to a wall surface 104. The wall surface 104 includes a wall covering 106, which may be, for example, paint, wall paper, or a vinyl wall covering. It will be recognized that the wall surface 104 need not include a wall covering 106, and that the adhesive article 102 may be adhered directly to the wall surface 104. The wall surface 104 may be formed of a material, such as plaster, that is fragile and easily damaged. The stretch releasing adhesive article 102 includes a double-sided stretch releasing adhesive strip 108 and a backplate 110 adhesively bonded to the adhesive strip 108.

Figure 3:
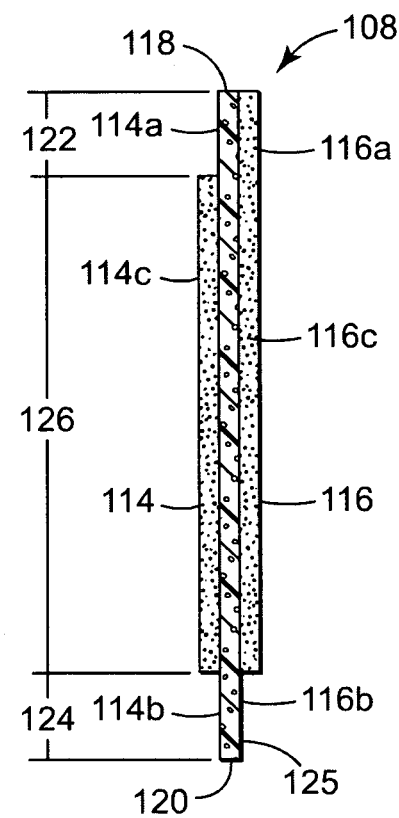
FIG. 3 is a cross-sectional side view of the stretch releasing adhesive strip of FIG. 2.

Referring to FIG. 3, which shows the adhesive strip 108 by itself, the adhesive strip 108 is a generally flat elongated strip having first and second opposed major surfaces 114, 116, respectively, and first and second ends 118, 120, respectively. The adhesive strip 108 includes three regions: (1) a first end region 122 adjacent the adhesive strip first end 118 having a non-adhesive first surface 114a, which serves as a contact surface with the wall surface 104, and an adhesive second surface 116a, (2) a second end region 124 adjacent the adhesive strip second end 120 having non-adhesive first and second surfaces 11 4b, 116b, respectively, thereby forming a non-adhesive pull tab 125 adjacent the adhesive strip second end 120, and (3) an intermediate region 126 between the first end region 122 and second end region 124 having adhesive first and second surfaces 114c, 116c, respectively.

Figure 4:
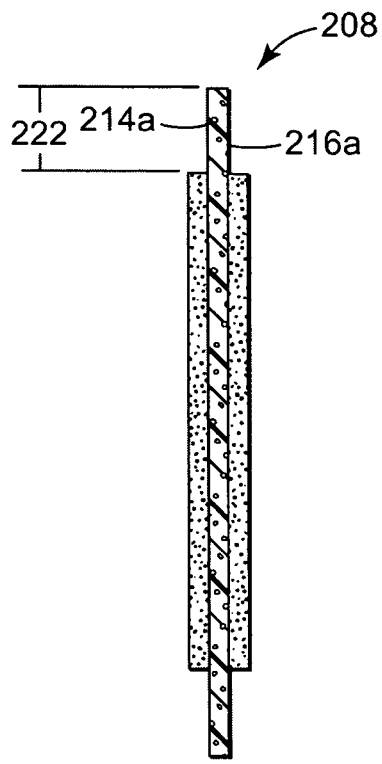
FIG. 4 is a cross-sectional side view of a second stretch releasing adhesive strip.

FIG. 4 shows an alternate adhesive strip 208 suitable for use in the stretch releasing adhesive article of the present invention. The adhesive strip 208 is similar to the adhesive strip 108 of FIG. 3 except that instead of only the first surface 214a of the first end region 222 being non-adhesive, both the first and second 214a, 216a surfaces of the first end region 222 are non-adhesive.

The adhesive strip 108 may have the general construction of any conventionally known stretch releasing strip including a pressure sensitive adhesive strip with an elastic backing, a pressure sensitive adhesive strip with a highly extensible and substantially inelastic backing, or a solid, elastic pressure sensitive adhesive. Specific stretch releasing adhesive strips suitable for use in the various embodiments of the present invention include the pressure sensitive adhesive strips with elastic backings described in U.S. Pat. No. 4,024,312 (Korpman), the pressure sensitive adhesive strips with highly extensible and substantially inelastic backings described in U.S. Pat. No. 5,516,581 (Kreckel et al.) and Bries et al. (U.S. Pat. No. 6,231,962); and the solid, elastic pressure sensitive adhesive described in German Patent No. 33 31 016.

The non-adhesive contact surface 114a may be formed using conventional techniques such as not coating the surface with adhesive, treating an otherwise adhesive surface to render the surface non-adhesive, or coating an adhesive surface with a material, such as a power, ink, or film, to render it non-adhesive.

Figure 5:
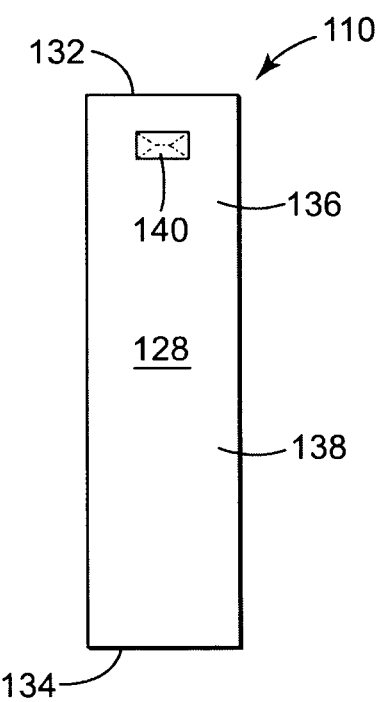
FIG. 5 is a bottom plan view of the base plate of FIG. 2.
Figure 6:
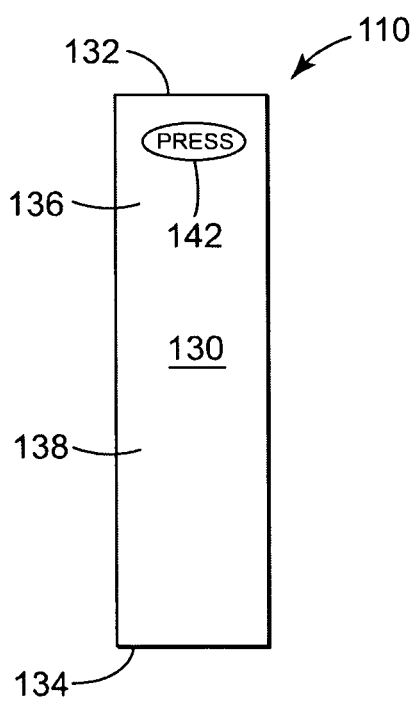
FIG. 6 is a top plan view of the base plate of FIG. 2.

Referring to FIGS. 2, 5, and 6, the backplate 110 includes first and second opposed major surfaces 128, 130, respectively, and first and second ends 132, 134, respectively. The second major surface 130 of the backplate 110 may be provided with a functional portion, such as a hook (not shown), that can be used to support an object on the wall surface 104, or the backplate 110 may be provided with an attachment mechanism for connecting a separate item, such as a hook or a hook-and-loop attachment system, that can be used to support an object on the wall surface.

The backplate 110 includes a first end portion 136 adjacent the first end 132 arranged in overlapping relation with the adhesive strip 108 first end portion 122, and a second end portion 138 that extends from the first end portion 136 to the second end 134.

In accordance with a characterizing feature of the invention, the backplate 110 first end portion 136 first major surface 128 includes an outwardly extending protrusion 140 arranged such that the protrusion 140 is in overlapping relation with the adhesive strip 108 first end portion 122. By arranging the protrusion 140 in this manner, when a user manually urges the first end portion 136 of the backplate 110 in the direction of the wall surface 104—for reasons that are described below—the protrusion 140 serves to focus the force in the region of the adhesive strip 108 first end portion 122, and more particularly, in the region of the non-adhesive surface 114a. Or, stated another way, the protrusion 140 is arranged in overlapping relation with the non-adhesive surface 114a of the adhesive strip to ensure that a force applied by a user to the first end portion 136 of the backplate 110 is focused in the region of the non-adhesive surface 114a.

The particular shape or structure selected for the protrusion 140 is not significant to the invention, so long as it provides the desired function of focusing the applied force in the region of the non-adhesive surface 114a. For example, the protrusion may be a pyramid as shown in FIG. 5. Alternatively, the protrusion may be one or more domes or posts, or one or more continuous or discontinuous raised lines extending partially or wholly across the width of the backplate.

The backplate 110 first end portion 136 second major surface 130, which is the exposed surface of the backplate seen by the user when the backplate is mounted on a wall surface, may be provided with indicia 142 instructing the user where to press the backplate 110 during the removal process. The indicia 142 is arranged opposite the protrusion 140 to ensure that the applied force is directed to the first end region 122 of the adhesive strip 108.

By aligning the protrusion 140 with the non-adhesive surface 114a and instructing a user to apply a force to the backplate opposite the protrusion 140, the non-adhesive contact surface 114a will be urged into contact with the wall surface 104 during the stretch removal process. By urging the non-adhesive contact surface 114a into contact with the wall surface 104, the adhesive strip 108 can be cleanly removed from the wall surface 104 without damaging the wall covering. In addition, the manual force serves to hold the backplate in place during the removal process, thereby preventing the backplate from catapulting when the adhesive strip releases from the wall surface.

Wall damage is prevented because the force applied by the user in the direction of the wall surface 104 serves to reinforce the wall covering 106 in the region of the wall surface 104 where the stretch removal force becomes concentrated as the adhesive strip 108 is progressively debonded from the wall surface 104. That is, the pressing force applied by the user counterbalances the stretch removal force. During most of the removal process, the adhesive bond area between the adhesive strip 108 and the wall covering 106 is large enough to distribute the removal force over a large enough area that the wall covering 106 does not fail, that is, it does not tear or rupture. As the removal process proceeds, however, the adhesive bond area is reduced so that the entire removal force is concentrated in a smaller and smaller region until eventually the removal force exceeds the cohesive strength of the wall covering and the wall covering fails and a piece of the wall covering tears and is pulled away by the adhesive strip.

It is noted that wall damage may occur even if the terminal region of the adhesive strip is provided with a non-adhesive area adjacent the wall surface if no force is applied in the region of the non-adhesive surface of the adhesive strip because damage occurs at the terminal region of the adhesive, not at the terminal region of the adhesive strip. So wherever the adhesive ends, damage may occur. In addition, the adhesive strip may not cleanly remove even if a force is applied to the end of the adhesive strip if the adhesive strip is not provided with a non-adhesive surface adjacent the wall surface. That is, if the adhesive strip is not provided with a non-adhesive surface at the terminal region of the adhesive strip adjacent the wall covering opposite the pull tab, but instead has an adhesive surface at the terminal region of the adhesive strip adjacent the wall covering, and a force is applied in the region of the adhesive surface, the pressing force will tend to pinch the adhesive strip and the adhesive strip may tear at the end of the removal process before it is completely removed from the wall surface. Thus, it is only through the combination of a non-adhesive surface at the terminal region of the adhesive strip adjacent the wall covering and by applying a force in the region of the non-adhesive surface that the adhesive strip can be completely and cleanly removed without damaging the wall covering.

To allow sufficient space for the user to press against the first end portion of the backplate 136 and to minimize the force applied to the intermediate adhesive surface 114c, which will interfere with the stretch removal process, an exemplary non-adhesive contact surface 114a will have a length of at least 0.4 millimeters (mm), more typically at least 0.5 mm, and even more typically, at least 0.6 mm. Contact surfaces having greater lengths may also be used but at some point the benefit of an increased non-adhesive contact surface length is outweighed by the loss of adhesive area.

FIG. 7 illustrates the method of removing a stretch releasing article from a wall surface in accordance with the present invention. It will be noted that in accordance with the method of removing the stretch releasing article 102 from a wall surface 104, the backplate 110 need not include a protrusion 140 for focusing the force applied by the user.

To remove the stretch releasing article 102 from the wall surface 104, a manual force $F_1$ is applied by the user to the first end portion 136 of the backplate 110 (i.e. to the top of the backplate 110 at the end opposite the pull tab 125) in the direction of the wall surface 104 to firmly hold the adhesive strip 108 non-adhesive surface 114a against the wall surface 104, thereby generating a force that will prevent the wall covering 106 from being damaged during the removal process. The user then grasps the non-adhesive pull tab 125 and stretches the adhesive strip 108 by applying a force $F_2$ in a direction substantially parallel to the wall surface 104. The user continues to stretch the adhesive strip 108 until the entire adhesive surface 114c of the adhesive strip 108 debonds from the wall surface 104. Once the intermediate adhesive surface 114c has completely debonded from the wall surface 104, the stretching force $F_2$ can be released, and the stretch releasing adhesive article 102 can be removed from the wall surface 104 by simply releasing the pressing force $F_1$ and lifting the adhesive article 102 away from the wall surface 104. To allow the adhesive article 102 to be reused (i.e. re-mounted with a new adhesive strip), the adhesive strip 108 is separated from the adhesive article 102 by stretching the adhesive strip 108 to that the remaining portion of the adhesive strip 108 debonds from the adhesive article 102.

FIGS. 8 and 9 show two alternate backplates 310, 410, respectively, suitable for use in the various embodiments of the present invention. The backplate 310 shown in connection with stretch releasing adhesive article 302 of FIG. 8 includes first and second end portions 336, 338 and is similar to the backplate shown in FIGS. 2, 5, and 6 except the first end portion 336 tapers to a point at the first end 332, thereby increasing the flexibility of the first end portion 336 and allowing it to be more readily pressed against the wall surface 104.

Although the tapered first end portion 336 is shown as being formed by slanting the first major surface 328 of the first end portion 336 away from the adhesive strip 308, thereby creating a gap 344 between the first end portion 336 of the backplate 310 and the adhesive strip 308, the taper may also be formed by slanting the second surface 330 of the first end portion 336 toward the first major surface 328, such that there is no gap between the first end portion 336 of the backplate and the adhesive strip 308, or by slanting the first and second surfaces 328, 330 of the first end portion 336 toward each other.

FIG. 9 shows a backplate 410 in which the first end portion 436 and second end portion 438 are connected by a hinge 446, which may be a living hinge or a conventional mechanical hinge. By connecting the first end portion 436 and second end portion 438 in this manner, the first end portion 436 can be pivoted from a first position adjacent the second major surface 430 of the backplate 410 second end portion 438 to second position adjacent the first end region 422 of the adhesive strip 408. When the first end portion 436 is positioned against the first end region 422 of the adhesive strip 408, a user can press the first end potion 436 against the wall surface to remove the adhesive article 402 from the wall surface 404 as described above. Alternatively, a hinge 446 having improved flexibility may be formed by providing a region of reduced thickness along the second surface 430 of the backplate 410.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A stretch releasing adhesive article for mounting on a wall surface, comprising:
    (a) an elongated stretch releasing adhesive strip having first and second opposed major surfaces, first and second ends, and a non-adhesive pull tab forming said second end, at least said first major surface including a non-adhesive contact surface adjacent said first end; and
    (b) a backplate having first and second opposed major surfaces and first and second ends arranged adjacent said adhesive strip second major surface, said backplate first major surface including a protrusion arranged in overlapping relation with said adhesive strip non-adhesive contact surface, thereby to concentrate a force applied by a user in the region of the first end of the backplate in the region of the non-adhesive contact surface of the adhesive strip during the removal process.

2. An article as defined in claim 1, wherein the protrusion is in contact with the adhesive second major surface of the adhesive strip.

3. An article as defined in claim 1, wherein the non-adhesive contact surface has a longitudinal length of at least 0.5 millimeters.

4. An article as defined in claim 1, wherein the adhesive strip second major surface adjacent said first end is non-adhesive.

5. An article as defined in claim 1, wherein said backplate second major surface opposite said protrusion is provided with indicia indicating where a user should press during the removal process.

6. An article as defined in claim 1, wherein said backplate includes a tapered first end portion arranged in overlapping relation with said adhesive strip non-adhesive contact surface.

7. An article as defined in claim 1, wherein said backplate includes a first end portion hingably connected with a second end portion and said first end portion is movable between a first position adjacent said backplate second end portion and a second position adjacent said adhesive strip.

8. An article as defined in claim 1, wherein said adhesive strip further has a first end surface extending between said first and second major surfaces at said first end, and further wherein said non-adhesive contact surface is provided by said first major surface apart from said first end surface.

9. An article as defined in claim 1, wherein said non-adhesive contact surface has a longitudinal length that is greater than a thickness of said adhesive strip.

10. An article as defined in claim 1, wherein the protrusion is arranged between the adhesive strip first and second ends adjacent the adhesive strip second major surface opposite the non-adhesive contact surface.

11. A method of adhesively mounting an item to, and removing an item from, a wall surface susceptible to damage without damaging the surface, said method comprising the steps of:
    (a) providing an elongated stretch releasing adhesive strip having first and second opposed major surfaces, first and second ends, and a non-adhesive pull tab forming the second end, at least the first major surface of the adhesive strip including a non-adhesive contact surface adjacent the first end, whereby the non-adhesive contact surface is arranged adjacent the delicate surface;
    (b) adhesively bonding the item to the wall surface by adhering the adhesive strip first major surface to the wall surface and arranging the item on the adhesive strip second major surface, thereby bonding the item to the wall surface;
    (c) applying a force to the item opposite the strip non-adhesive contact surface, thereby to firmly maintain the non-adhesive surface of the adhesive strip in contact with the wall surface during the removal process; and
    (d) stretching the adhesive strip by applying a longitudinal force to the non-adhesive pull tab to debond the adhesive strip from the item and the wall surface.

12. The method of claim 11, wherein the wall surface is selected from at least one of paper, paint, and vinyl.

13. The method of claim 11, wherein the wall surface is a vinyl wall covering.

14. The method of claim 11, wherein said adhesive strip further has a first end surface extending between said first and second major surfaces at said first end, and further wherein said non-adhesive contact surface is provided by said first major surface apart from said first end surface.

15. The method of claim 11, wherein adhering the adhesive strip first major surface to the wall surface is characterized by the non-adhesive contact surface facing the wall surface.

16. The method of claim 11, wherein step (c) is characterized by the non-adhesive surface directly contacting the wall surface.

* * * * *